April 9, 1968  K. M. SMEDSTAD  3,376,668
ROLL-UP CLOSURES FOR VEHICLES
Filed March 29, 1966  3 Sheets-Sheet 1

INVENTOR
Kenneth M. Smedstad

April 9, 1968 K. M. SMEDSTAD 3,376,668
ROLL-UP CLOSURES FOR VEHICLES
Filed March 29, 1966 3 Sheets-Sheet 2
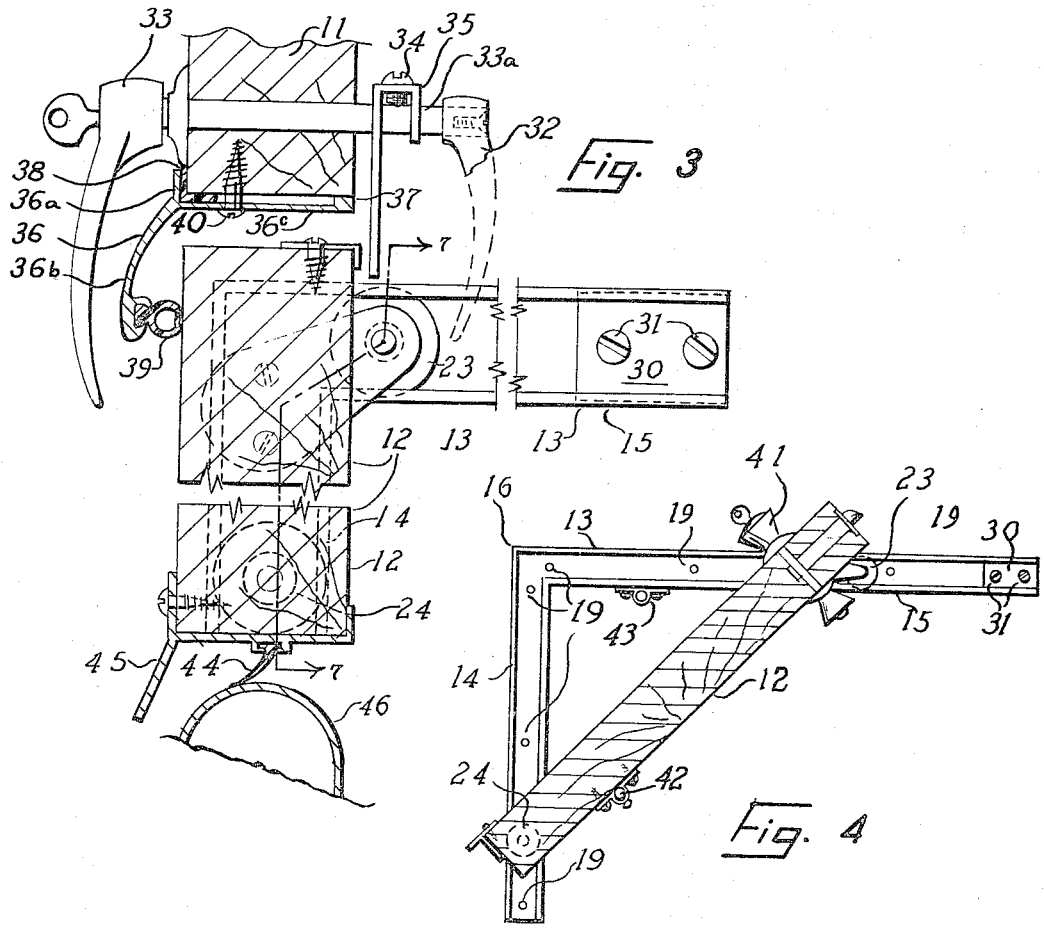
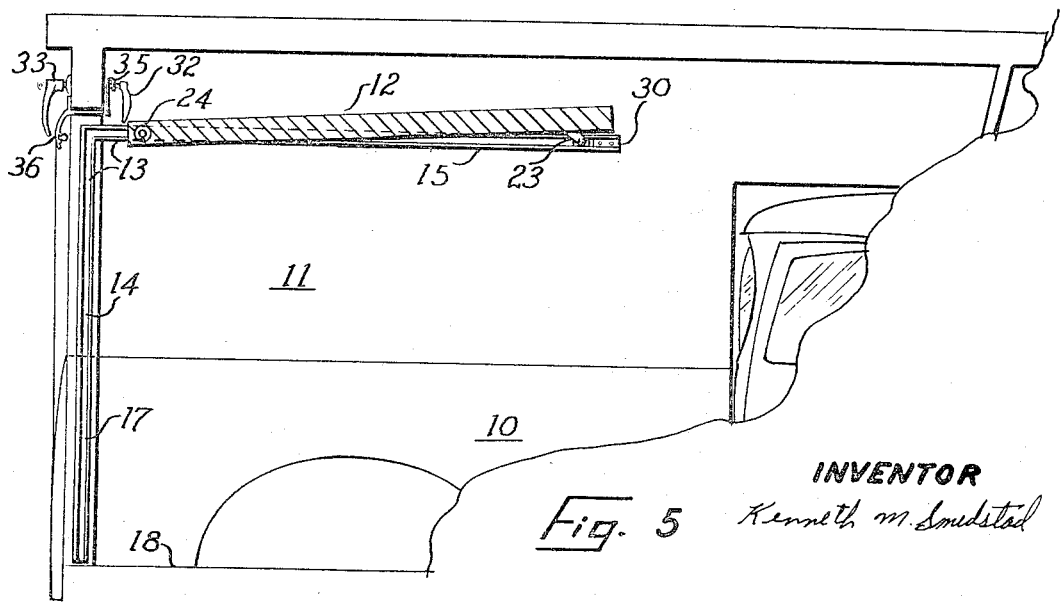
INVENTOR
Kenneth M. Smedstad April 9, 1968  K. M. SMEDSTAD  3,376,668
ROLL-UP CLOSURES FOR VEHICLES
Filed March 29, 1966

INVENTOR
Kenneth M. Smedstad

# United States Patent Office 3,376,668
Patented Apr. 9, 1968

3,376,668
ROLL-UP CLOSURES FOR VEHICLES
Kenneth M. Smedstad, 8313 Gordian Way,
Orangevale, Calif. 95662
Filed Mar. 29, 1966, Ser. No. 544,345
3 Claims. (Cl. 49—197)

ABSTRACT OF THE DISCLOSURE

The rear opening in a camper body, or canopy, is covered by a lockable door in vertical attitude. The lateral edges of the door are provided with rollers engaging a track structure mounted on the canopy, the track and rollers being so arranged that as the upper portion of the door is urged forwardly by the operator, the bottom of the door travels directly upwardly, thence directly forwardly as the door reaches horizontal attitude, with but a minimum of rearward projection of the bottom of the door as movement of the door takes place. Additional structure secures the door in open, horizontal attitude.

This invention relates to certain new and useful improvements in the design and construction of a roll-up door and, more particularly to the improvements in roll-up door hanger assembly for guiding the movement of a roll-up door between closed and open positions. While the invention is particularly useful in "camper bodies" in association with a pick-up truck or similar vehicle, it is also useful in association with public service or vending vehicles and the like. Another purpose of the present invention is to provide an improved and safer means of securing the roll-up door which may be locked in open or closed position.

Usually, "camper" structures are sold with horizontal hingedly fitted hanger assemblies for mounting the rear door and this, however, has the disadvantage that the door is comparatively heavy, requires telescoping props or the like and, when left in raised position, such as when hauling protruding loads, after many miles of travel, especially over secondary roads, or rough terrain, they tend to work loose and give rise to structural defects.

Other disadvantages of the hingedly fitted hanger assemblies for mounting the rear door, or side door in the case of vending vehicles, is the potential danger of injury to persons walking near said door, either from the door falling or from accidently hitting the sharp corners, usually about eye level when in raised position, making it especially hazardous during loading and unloading of the vehicle. Yet another disadvantage of closures and the like of the prior art lies in the fact that they cannot be backed up to many loading docks because of the protruding door. If the door is left in raised position when towing a trailer or the like, much damage can come to the canopy or the trailer if one were to make a sharp turn. So also, unloading or loading while the vehicle is hitched to a trailer is very difficult and would usually necessitate disconnecting the trailer especially if the rear door of the canopy were of the type that replaces the tail gate of the pick-up.

The present invention obviates these disadvantages.

Previously the art has developed a wide variety of closure assemblies and the like but the need still remains for an improved, simplified, and economical roll-up type door assembly embodying reliable, safe and, conveniently operable means.

Accordingly, it is the principal object of this invention to provide an improved roll-up door and hanger assembly embodying novel unitary structural features that can be used in any standard "camper" canopy or public service vending body for pick-up trucks or similar vehicles.

Another object of this invention is to provide a weatherproof and dustproof joint at the intersection of the body and door this feature being especially important when this invention is used in public service vending vehicles and the like such as those used in transporting food products.

Another object of the present invention is to provide a roll-up closure of simple construction and installation.

Another object of this invention is to provide a closure for a vehicle that presents a substantially aesthetic appearance.

Another object of this invention is to provide a new and improved freely slidable relationship between the roller axle means and the mounting bracket means which provides for automatically accommodating itself to differences in the distance between the combination of two tracks mounted on either side of the doorway, thus eliminating the time consuming and costly adjustment of track means during installation.

Still another object of the present invention is to provide a means of the foregoing character including a handle with locking cylinder, of common use, with key removable in locked or unlocked position for use in relation with the roll-up door means.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be used.

The above and further objects, features and, advantages of this invention will appear from time to time from the following description of a preferred embodiment thereof as illustrated in the accompanying drawings.

In the drawings:

FIG. 3 is a detail view partially broken away on line 3—3 of FIGURES 1 and 2 only showing the present invention in closed position.

Figure 1:
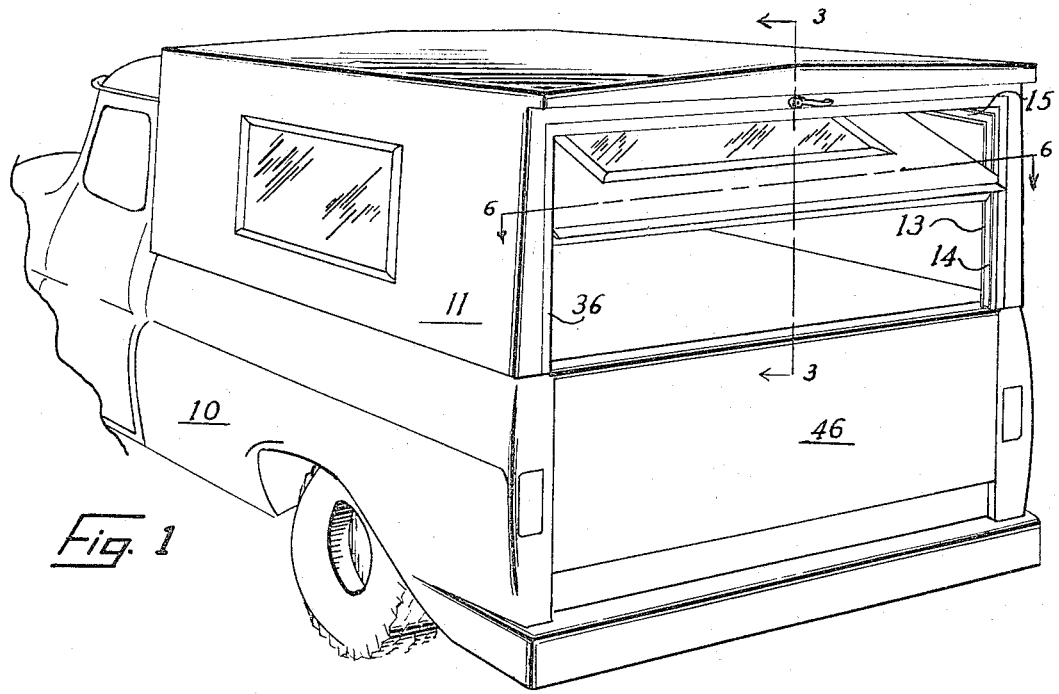
FIG. 1 is a perspective view of a typical pick-up truck and camper combination having the present invention embodied therein and showing the door in transition.
Figure 2:
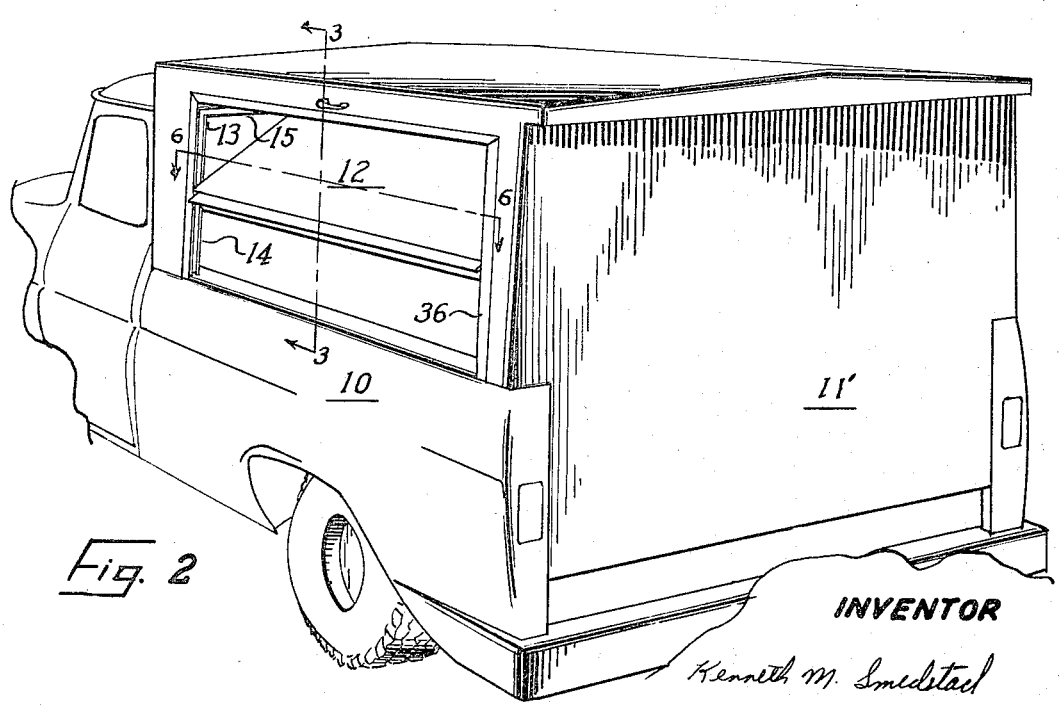
FIG. 2 is a similar view showing the truck with a vending body having the present invention therein and showing the door in transition.

FIG. 4 is a similar view taken on line 3—3 of FIG. 1 and FIG. 2 showing track alone and its relationship with the door when it is in transition. This figure also shows a handle lockable from the inside or the outside, common to the art, installed in the top of the door. This figure also shows a sliding bolt for securing the door in raised position.

FIG. 5 is a sectional view partially broken away taken on line 3—3 of FIG. 1 only showing the door in raised position. This figure also illustrates the embodiment of a door large enough to pervade the space left open when the tailgate portion of the pick-up truck is removed.

Figure 6:
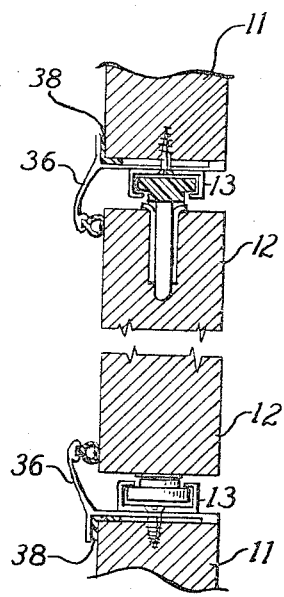

FIG. 6 is a horizontal sectional view partially broken away taken on line 6—6 of FIGURES 1 and 2.

Figure 7:
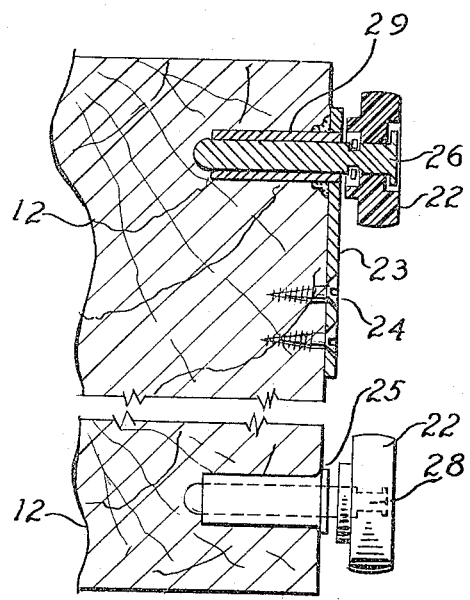

FIG. 7 is a view partially in section taken on line 7—7 of FIGURE 3, showing top and bottom roller.

Figure 8:
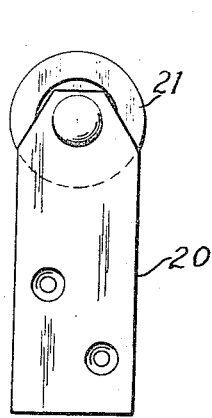

FIG. 8 is a side view of a conventional roller means common to the art that can be used as a substitute for the roller assemblies illustrated in FIGURE 7.

Figure 9:
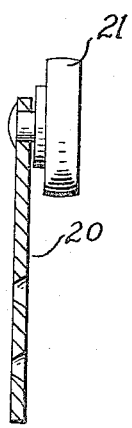

FIG. 9 is a front view, partially in section, of the FIGURE 8 form of roller.

Having thus described the present invention, the particulars and features of the best mode presently contemplated for carrying out the same will now be set forth so as to enable those skilled in the art to make and use this invention.

With reference to FIGS. 1 and 2 of the drawings it will be understood that a typical pick-up truck 10 with a camper 11 or a vending body 11' is therein illustrated showing a roll-up door or panel 12 of any conveniently and well known construction mounted in the body of the camper 11 or vending vehicle body 11'. More particularly, the door assembly is suspended from a pair of track assemblies 13, said assemblies 13 being made up of two portions, first a vertical portion 14 and second a horizontal portion 15 to be installed in such a predetermined relationship with each other as to form a right-angled corner.

Referring to FIG. 4, the general construction of the track 13 is clearly illustrated, being made up of two channel portions 14 and 15 joined at the corner 16. Thus when joined in this manner the bottom roller, later described, can freely be moved up the vertical portion of the track 14 to the corner and diverted into the horizontal portion of the track 15. A variation of this principle is illustrated in FIG. 5.

FIG. 5 pictures the track assembly 13 with a vertical portion 14 and a downward extension thereof 17. The extended portion of the vertical track 17 would accommodate a closure of such size as to fill the space left open when the tail gate of the pick-up is removed. Usually this portion 17 would extend to the floor of the pick-up bed 18. This size of door would also make it necessary to extend the horizontal portion of the track 15 to accommodate the larger door. The vertical portion of the tracks 14 and 17 is rigidly secured to the jamb of the door. A convenient supporting arrangement for the horizontal portion of the track 15 is to construct the canopy with such dimensions that the distance between the side panels at the top of the doorway is equal to the distance between the door jambs, thus allowing the horizontal portion of the track 15 to be attached directly to the inside wall of the "camper." Of course in some cases this is not practical and in such cases a special supporting means such as a bracket would necessarily be installed from the ceiling or sidewall of the camper to support the horizontal track. The entire track assembly 13 can be secured to the superstructure by an attaching means such as screw fasteners 19 thus the track is held in permanent fixed relation to the superstructure. A plurality of track engaging roller wheels, axles, and supporting brackets are used in relation to the track assembly 13 these being fastened to the lateral edges of the door 12.

A standard bracket and track engaging roller wheel common to the art such as illustrated in FIGURE 8 may be used. In this case, bracket 20 and roller 21 means are installed with screw fasteners in such fixed predetermined relation to the lateral edge of the door 12 as to permit the top roller to remain in the horizontal portion of the track 15 at all times with the bottom roller in a fixed relation to the outside lateral portion of the door in the lower corner.

To open the door 12 the bottom roller 24 must travel the full length of the vertical tracks 17 and 14 to the intersection of the vertical track and the horizontal track 15, and divert into the horizontal track 15 where it must remain while in open position. As appears most clearly in FIGURE 5, the door 12 is held in the horizontal portion of the track 15, while in open position, between a limit stop 30 and the inside handle 32 which can be lowered into the path of the door assembly, thus securing the door in raised position. This handle assembly is also illustrated in FIGURE 3.

Referring to FIGURE 3, there is an outside handle of the type that can be locked at 33 in the down position shown in FIGURES 3 and 5 with a key. By locking the handle 33 while the door is in raised position it is safe to drive the vehicle since the lower end of the handle 32 interferes with the rearward movement of the raised door. The outside locking handle 33 has a shaft 33a extending to the inside of the camper. The inside handle 32 is secured to the shaft 33a by any suitable means such as a set screw. The locking handle 33 and retaining handle 32 assembly can be any type common to the art.

Many handle assemblies are manufactured with a J-shaped bracket 35 which can be secured to the handle shaft 33a by means of a set screw 34. This bracket 35 works especially well in securing closure in the closed position, as appears most clearly in FIGURE 3.

Referring to FIG. 4 it will be noted that an improved system of securing the door in closed position is pictured. The latch herein pictured 41 is common to the art but is especially applicable for this job because it provides a means of locking the closure from the inside such as when one would be sleeping inside the canopy. To secure while in open position a gate latch or a sliding bolt 42 can be employed. The retainer for the gate latch or sliding bolt would be placed in a logical position such as in FIG. 4 where a common sliding bolt retainer 43 is secured to the track.

In FIG. 3 it will be noted by those skilled in the art that a retainer is employed for weatherstripping and dustproofing. A retainer such as a metal extrusion 36 having a general T-shaped cross section is preferable, such as that illustrated. This retainer 36 has a flange 36a extending upward. Between the flange 36a and the vehicle body 11 is used any of many weatherstripping or sealing agents 38. The lower flange 36b is recessed to accept a sealing means such as a resilient insert 39 of some applicable material, with a cross section in general of O or U shape. Thus a dustproof and weatherproof joint is provided between the camper and the door. Through the third flange 36c, which has a thicker section 37 at the edge thereof to serve as a fulcrum forcing a good seal, are disposed through predrilled holes screw fasteners 40 or any other applicable attaching means. Thus the door retainer 36 with its weatherstripping insert 39 is rigidly secured to the door jamb and header.

Referring to FIG. 6 it will be noted that the vertical portion of the door retainer extrusion 36 and the vertical portion of the roller engaging track assembly 13 can be secured with the same screw fasteners if so desired.

Referring back to FIG. 3 it will be noted that there is provided an extrusion of general T shape 45 for retaining the tailgate 46 of the pick-up as well as holding a resilient weatherstripping insert 44. These extrusions are common to the art.

Much valuable time can be saved by using the improved track engaging roller means illustrated in FIG. 7. The improved system uses two types of roller brackets. The roller and axle for the top and bottom rollers are basically the same, being interchangeable, and consist of a roller wheel 22 and a shaft in permanently fixed relationship with said wheel. The shaft can be secured to the wheel with a common spring clip 26 or of any other suitable means such as a riveted type axle 28. For the top roller assembly a bracket, preferably constructed as a metal stamping 23 and an axle sleeve 29 permanently attached to the bracket 23, provides a retaining means for the roller and shaft assembly as mentioned above. This relationship between bracket sleeve 29 and axle 26 or 28 is freely slidable and provides for automatic adjustment and compensation of any variation in the distance between the track assemblies. The lower wheel shaft retainer is simply a sleeve 25 press-fit into an opening in the lower lateral portion of the door.

The general design of the individual parts of the invention as explained above may be varied according to requirements in regards to manufacture and production thereof, while still remaining within the spirit and principle of the invention, without prejudicing the novelty thereof.

What is claimed is:

1. A roll-up door assembly to be used in association with a canopy mounted on vehicles, such as pick-up trucks or the like, said door assembly comprising:

(a) a door having a predetermined height and width to cover in vertical attitude thereof an opening in a vertical wall of said canopy;

(b) track means mounted on said canopy for guiding said door between a vertical attitude and a horizontal attitude, said track means including a pair of substantially vertical portions and a pair of substantially horizontal portions connecting with said vertical portions adjacent the respective upper ends thereof, said vertical portions being substantially coincident with the lateral margins of said canopy opening, and said horizontal portions extending away from said canopy opening substantially at right angles thereto;

(c) roller means mounted on said door, said roller means including an upper pair of rollers engaging said horizontal portions of said track means and a lower pair of rollers engaging said vertical portions of said track means, said upper pair of rollers being offset from the plane of said door in order to dwell at all times on said horizontal portions of said track means, said door being thereby supported by said upper pair of rollers in vertical attitude of said door;

(d) resilient means on the margins of said opening and said door cooperating to effect sealing between said canopy and said door in vertical attitude thereof; and, (e) latch means adjacent the upper margin of said opening interengaging said canopy and said door, said latch means being capable of locking said door in said vertical attitude and of holding said door in said horizontal attitude.

2. A door assembly as in claim 1 wherein said lower pair of rollers is located in close juxtaposition to the bottom corners of said door so as to limit the extent of horizontal projection of said bottom corners from said vertical portions of said track means as said door is moved between said vertical attitude and said horizontal attitude.

3. A door assembly as in claim 2 and further including a pair of downward extensions on said vertical track portions, and a downwardly enlarged door capable of enclosing both said opening in said canopy and the tailgate opening of a pick-up truck having the tailgate removed.

References Cited

UNITED STATES PATENTS

| 2,189,233 | 2/1940 | Vanderveld | 49—197 XR |
| 2,480,965 | 9/1949 | Remke et al. | 312—109 XR |
| 2,744,782 | 5/1956 | Backman | 312—138 XR |

KENNETH DOWNEY, *Primary Examiner.*